United States Patent [19]
Anderson et al.

[11] Patent Number: 5,813,467
[45] Date of Patent: Sep. 29, 1998

[54] COMPOSITE CYLINDER TERMINATION FORMED USING SNAP RING

[75] Inventors: Jeffrey J. Anderson, Sunnyvale; Donald A. Nance, Mountain View; Craig S. Mickelson, San Jose, all of Calif.

[73] Assignee: Northrop Grumman Corporation, Los Angeles, Calif.

[21] Appl. No.: 800,601

[22] Filed: Feb. 14, 1997

[51] Int. Cl.⁶ .............................. E21B 17/01; B29D 22/00
[52] U.S. Cl. .................. 166/367; 428/36.9; 428/36.91; 403/250; 403/259; 403/260; 403/334; 403/404; 405/169; 405/195.1; 285/114; 285/149; 166/350; 138/109; 138/139; 138/141
[58] Field of Search ................... 428/36.9, 36.91; 403/250, 259, 260, 334, 404; 405/169, 195.1; 285/114, 119; 166/350, 367; 138/109, 139, 141

[56] References Cited

U.S. PATENT DOCUMENTS

| | | | |
|---|---|---|---|
| 4,097,626 | 6/1978 | Tennent | 428/36 |
| 4,118,262 | 10/1978 | Abbott | 156/175 |
| 4,236,386 | 12/1980 | Yates et al. | 64/1 |
| 4,238,540 | 12/1980 | Yates et al. | 428/36 |
| 4,256,412 | 3/1981 | Tybus et al. | 403/263 |
| 4,470,621 | 9/1984 | Irvine | 285/114 |
| 4,634,314 | 1/1987 | Pierce | 405/195 |
| 4,701,231 | 10/1987 | Peters et al. | 156/172 |
| 4,709,231 | 11/1987 | Sakaibara et al. | 340/729 |
| 5,043,217 | 8/1991 | Peters et al. | 428/397 |
| 5,215,413 | 6/1993 | Nance | 403/259 |
| 5,439,323 | 8/1995 | Nance | 405/195.1 |
| 5,443,099 | 8/1995 | Chaussepied et al. | 138/109 |
| 5,474,132 | 12/1995 | Gallagher | 166/367 |

FOREIGN PATENT DOCUMENTS 1251262  10/1971  United Kingdom .

Primary Examiner—Samuel A. Acquah
Attorney, Agent, or Firm—Walter G. Sutcliff

[57] ABSTRACT

An end of a composite cylinder is formed about an end connection assembly having two longitudinally arranged pieces having a contour which prevents the withdrawal of the end connection assembly from the cylinder. The two pieces of the end connection assembly are relatively forced apart and a snap ring having a certain rest diameter is reduced in diameter and inserted into the end connection assembly to a position between the pieces. The snap ring then assumes its rest diameter positioned between the pieces, forcing them to maintain intimate contact with the inner surface of the cylinder, thus removing any residual gap from the assembly process and/or preloading the interface between the end of the composite cylinder and the end assembly prior to application of an axial load.

11 Claims, 9 Drawing Sheets

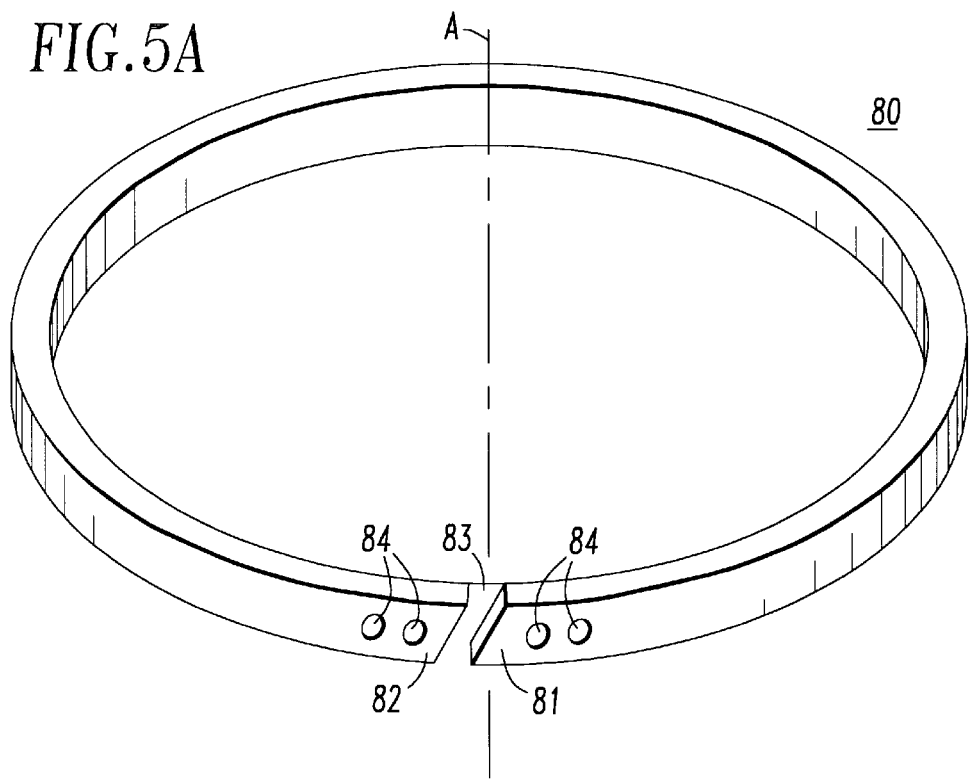
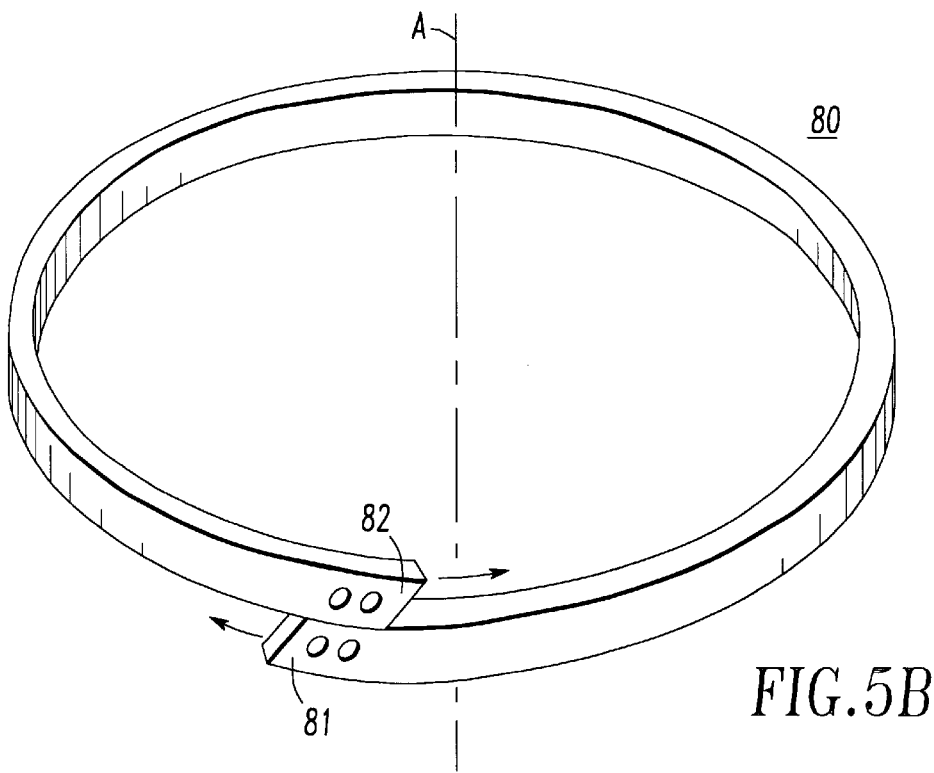

COMPOSITE CYLINDER TERMINATION FORMED USING SNAP RING

STATEMENT OF GOVERNMENT INTEREST

This invention was made with United States Government Support under Cooperative Agreement 70NANB5H1047 awarded by the U.S. Department of Commerce, National Institute of Standards and Technology. The United States Government has certain rights in the invention.

BACKGROUND OF THE INVENTION

1. Field of the Invention

The invention in general relates to composite structures and more particularly to tubular composites with an end connection.

2. Description of Related Art

The use of composite materials in place of metal for various structures is desirable for many reasons, including weight reduction, corrosion resistance, durability and increased strength.

One type of structure which finds use in a variety of applications is a tube, or cylinder, which must be joined to another similar or dissimilar structure, at either or both ends. Accordingly, an end piece, of a material such as metal, is provided as the cylinder termination for the joining process. The use of adhesives for bonding the metal end piece to the composite cylinder may be less than satisfactory under certain conditions, particularly in the presence of large bending moments or axial loads which leads to debonding. Extreme environmental conditions such as immersion in water can weaken the bond. Large temperature changes can cause joint failure due to coefficient of thermal expansion mismatch induced thermal stresses.

Mechanical fasteners have also been used for securing the composite cylinder to the metal end piece. However, this form of connection requires drilling holes which tends to weaken the composite. Their performance also degrades under extreme environmental conditions of high temperature and immersion in water.

In another arrangement, such as described in U.S. Pat. No. 4,701,231 a composite cylinder has an end which is wound over, and bonded to, a contoured end piece which is of such geometrical shape that it is locked in place. This geometrical lock type joint typically has a bonded interface between the composite and end piece, however under large load conditions the bond may fail, allowing undesired relative movement between the composite and the end piece. Or it may become highly loaded during fabrication or use due to temperature changes. As with a conventional bonded joint when the bond fails an undesirable gap may open up.

The present invention provides a solution to the end joint problem so as to allow for a structure which can accommodate relatively high axial loads and bending moments without failure of the joint or without excessive movement.

SUMMARY OF THE INVENTION

A composite-to-end connection arrangement in accordance with the present invention includes a hollow cylinder of composite material which extends along a central longitudinal axis. An end connection assembly includes first and second longitudinally arranged segments coaxial with the axis.

The end of the cylinder is formed about the segments so as to assume the contour thereof, the contour having a predetermined shape so as to prevent withdrawal of the segments from the cylinder.

A snap ring of rest diameter D and having first and second ends moveable relative to one another is compressed to a diameter smaller than D and is inserted into the end connection assembly. The first and second segments are separated and the snap ring assumes its larger diameter condition in a position between the segments, separating the segments and forcing them into intimate contact with the inner contoured surface of the cylinder to limit axial movement of the assembly due to a predetermined load condition.

BRIEF DESCRIPTION OF THE DRAWINGS

FIGS. 5A and 5B illustrate another type of snap ring which may be utilized in the present arrangement.

DESCRIPTION OF THE PREFERRED EMBODIMENTS

Although the present invention finds use with a variety of structures including rocket motor cases, pressure vessels and missile launcher tubes, it will be described by way of example with respect to a marine riser such as the drilling riser illustrated in FIG. 1.

Figure 1:
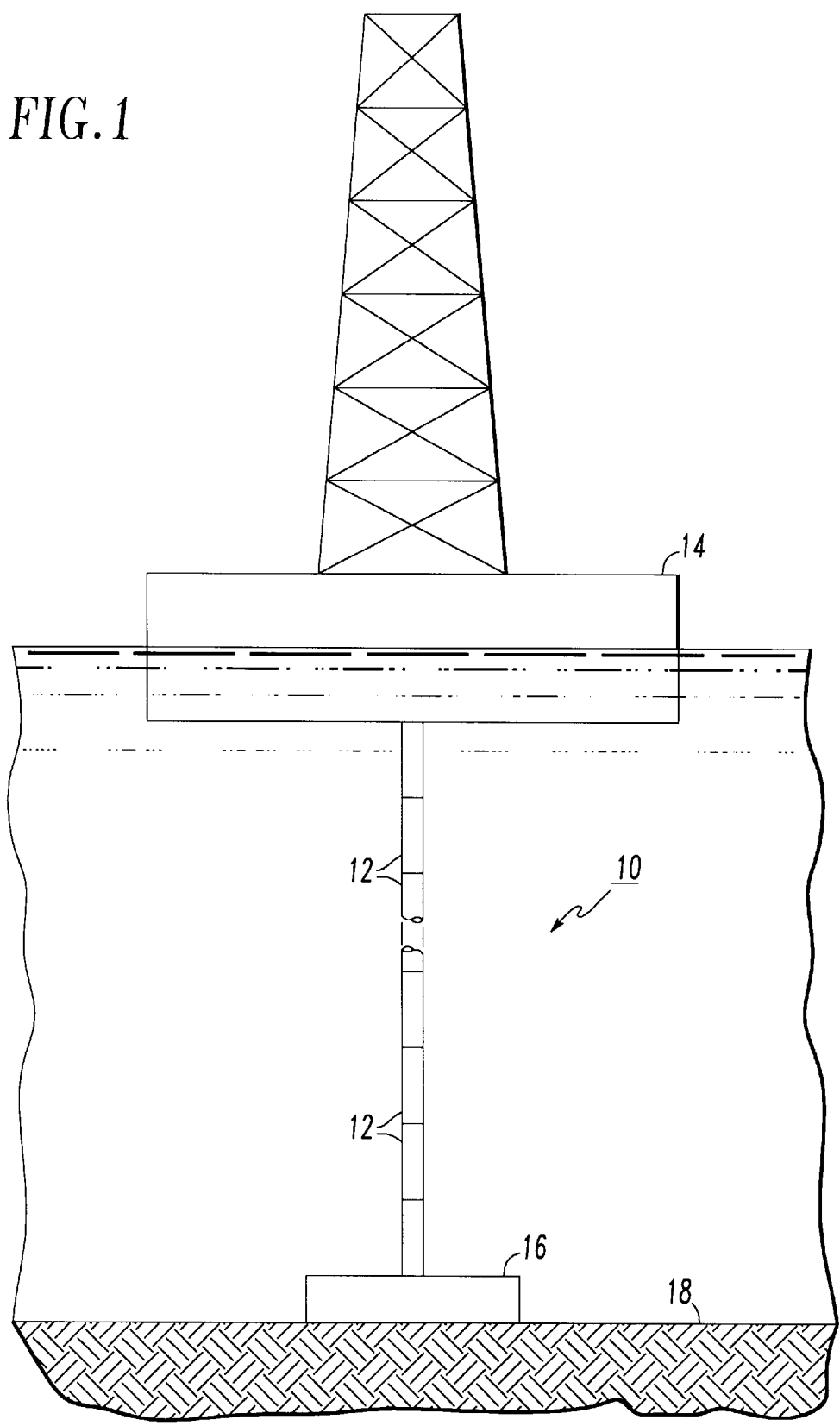
FIG. 1 illustrates one of many applications for the present invention.

In FIG. 1 a riser arrangement 10 made up of a plurality of riser sections 12 extends from a floating platform 14 at the surface to drilling equipment 16, such as a blowout preventer, located on the bed 18 of a body of water. The primary function of the riser 10 is to guide drill pipe and tools to the well bore and to provide a return path for drilling mud which is pumped down the center of the drill pipe to cool and lubricate the drill bit, flush tailings out of the bore and balance the hydrostatic pressure of the formation being drilled through.

Drilling risers are generally of medium strength steel which create significant weight loads for the floating platform 14. Accordingly, advanced composite drilling risers are being considered as a replacement for steel thereby significantly reducing the deck weight of the riser system, and allowing a greater number of riser sections to be carried, to extend the drilling capabilities to greater depths.

One key to implementing composite technology in drilling risers is the development of composite-to-steel structural joints between the composite cylinder and a steel end connector. A similar need exists in the case of production marine risers, which are similar to drilling risers but are of lesser diameter and are used after a producing well is established.

Figure 2A:
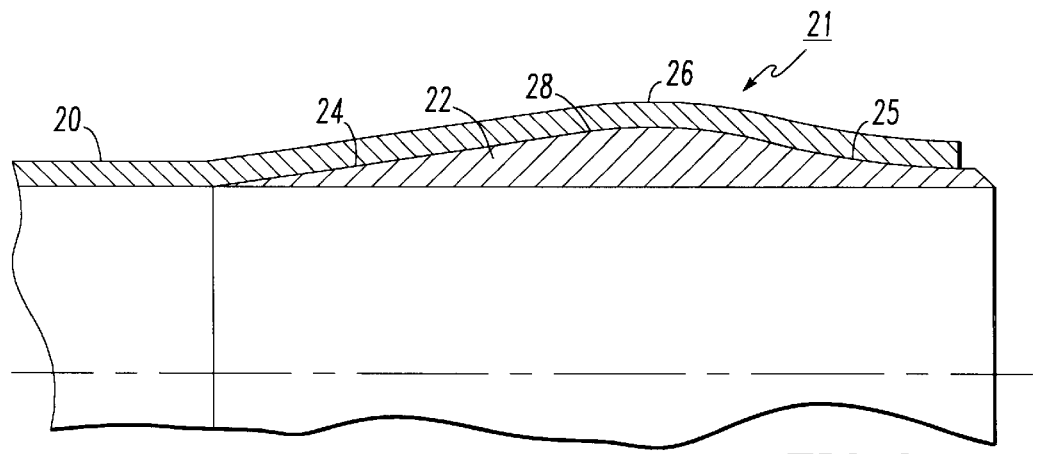
FIGS. 2A to 2C illustrate a geometric lock joint of the prior art.

FIG. 2A illustrates, in cross-sectional view, an end connection for a composite cylinder in an arrangement which prevents the connection from being withdrawn from the composite cylinder. The structural arrangement, more fully described in the aforementioned U.S. Pat. No. 4,701,231, includes a composite cylinder 20 which extends along a central longitudinal axis C. Cylinder 20 has an end portion 21 formed about an internal ring 22, such as by filament winding, to thereby conform to the contour of the ring 22. The contour of the ring 22 is defined by hyperboloidal surface portions 24 and 25 on either side of an isotensoidal, or circular arc surface portion 26, which defines the maximum diameter of the ring 22.

Figure 2B:
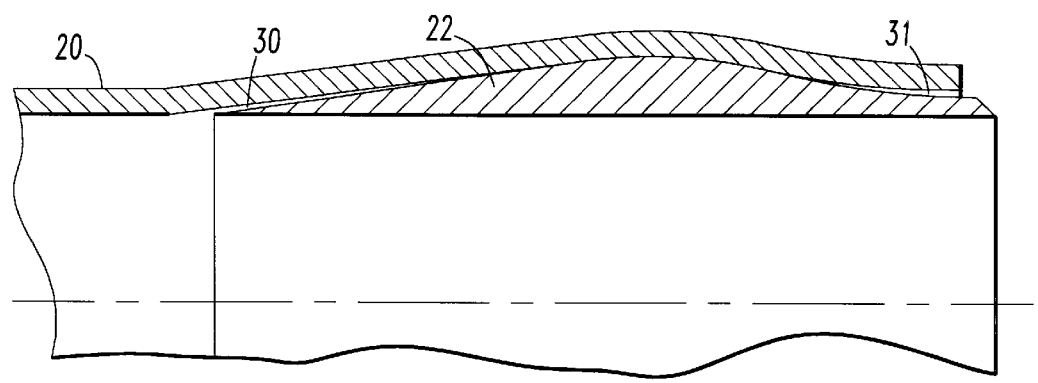

The arrangement typically incorporates an optional adhesive bond 28 between the ring 22 and the inner surface of the cylinder end 21. If an elevated temperature cure composite is used, its coefficient of thermal expansion needs to be tailored by varying the fiber type and orientation during winding so that it matches that of the material being wound over, typically steel, aluminum or titanium. A large coefficient of thermal expansion mismatch yields high residual thermal stresses in the bondline between the composite and metallic ring which may lead to debonding as the parts cool down from an elevated temperature. This is illustrated in FIG. 2B by debonded portions 30 and 31. A similar gap can occur if there is no adhesive at the interface with temperature environmental changes.

Figure 2C:
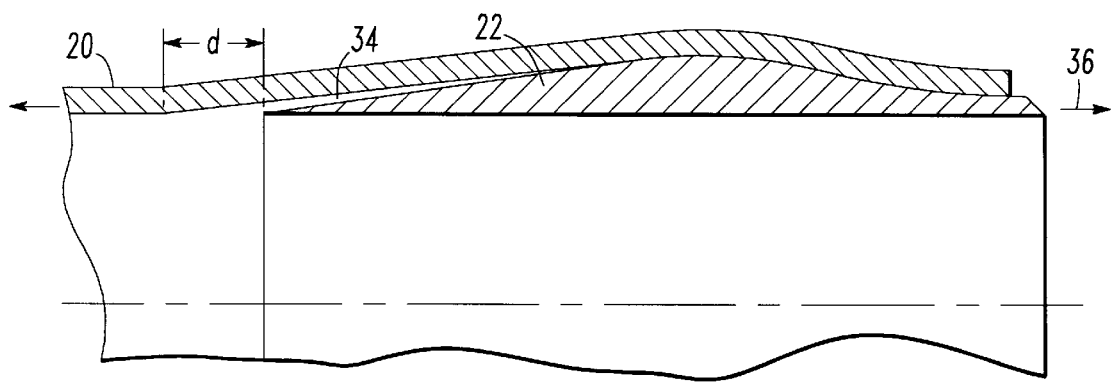

Stress concentrations and high residual thermal stresses can lead to premature bond failure as can poor bond quality, environmental effects and fatigue. Complete bond failure, as depicted by numeral 34 in FIG. 2C, results in a relatively large displacement, d, between the cylinder 20 and the initial position of ring 22, when subjected to an axial load represented by arrow 36. Although the ring 22 is not withdrawn from the cylinder 20 as a result of the axial load, large relative motions will cause damage to the composite cylinder 20 due to fretting and abrasion. The relative motion will also damage an inner liner, if used.

Figure 3A:
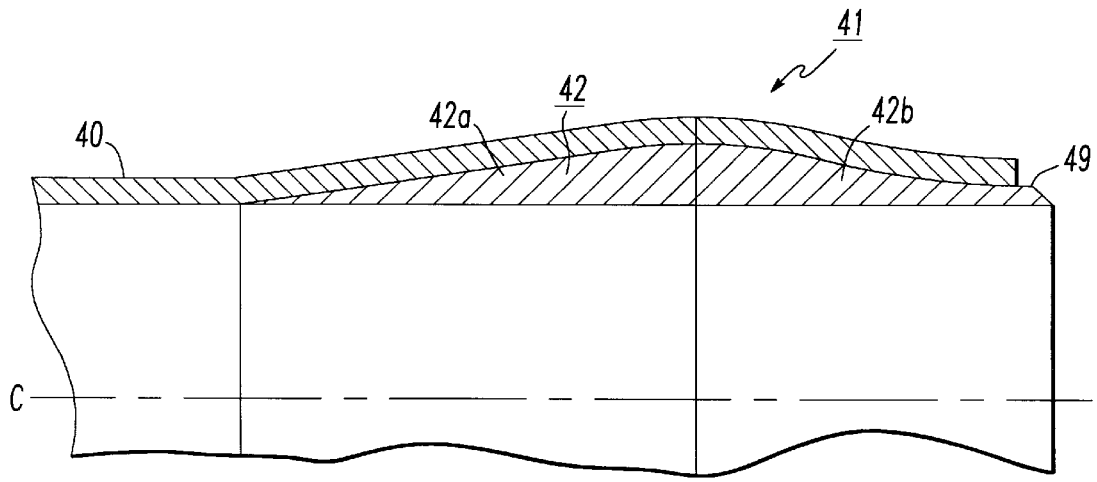
FIGS. 3A to 3C illustrate the principle involved in the present invention.
Figure 3B:
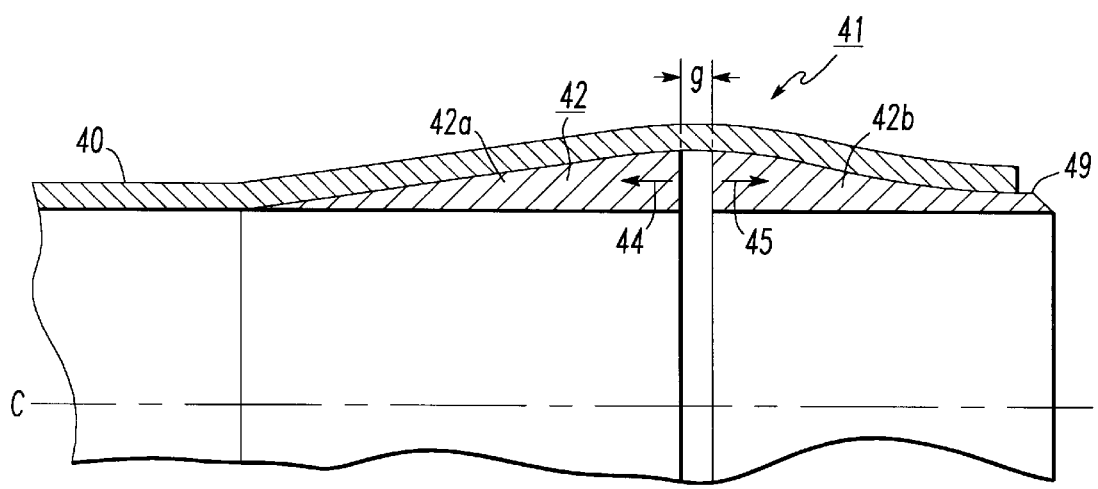
Figure 3C:
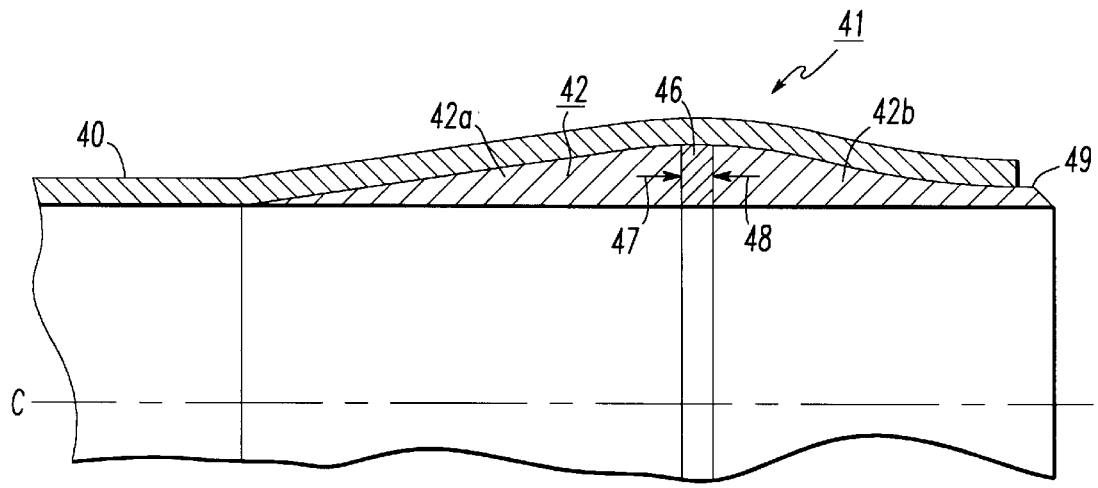

FIGS. 3A to 3C serve to illustrate the basic concept which the present invention utilizes. In FIG. 3A, a cylinder 40 of composite material extends along, and surrounds a central longitudinal axis C. An end 41 of the cylinder 40 is formed around an end connection assembly 42, having a contour which will prevent its withdrawal from the cylinder. The forming may be accomplished by a variety of composite fabrication processes such as filament winding, tape laying, roll wrapping or hand layup, to name a few. The end connection assembly may be of a metal such as steel and its contour may be as previously described in FIG. 2A with respect to ring 22.

The end connection assembly however in the present invention includes two longitudinally displaced segments, 42a and 42b which initially touch one another such as at the point of maximum outside diameter with one, or both, of the segments being free to move in an axial direction. That is, by use of a mold release agent covering their surface, they are not bonded to the inner surface of the cylinder.

The two segments 42a and 42b are relatively forced apart, as indicated by arrows 44 and 45 in FIG. 3B, leaving a gap g between them. The separation process may be accomplished by applying an external force to the outermost segment 42b, while holding segment 42a immobile or by tooling which contacts and separates both segments 42a and 42b to preload the composite-metal interface.

Once separated, and as indicated in FIG. 3C, a spacer 46 is inserted into the gap between the ends of segments 42a and 42b, the external separating force is removed, and the restoring force, as indicated by arrows 47 and 48, maintain the spacer 46 in position.

As shown in these Figs., as well as in the specific embodiment of the invention to be described, a portion, such as 49, of one of the segments extends past the end of the composite cylinder. An external connector may then be coupled to this extended portion for joining the cylinder to another structure.

Figure 4:
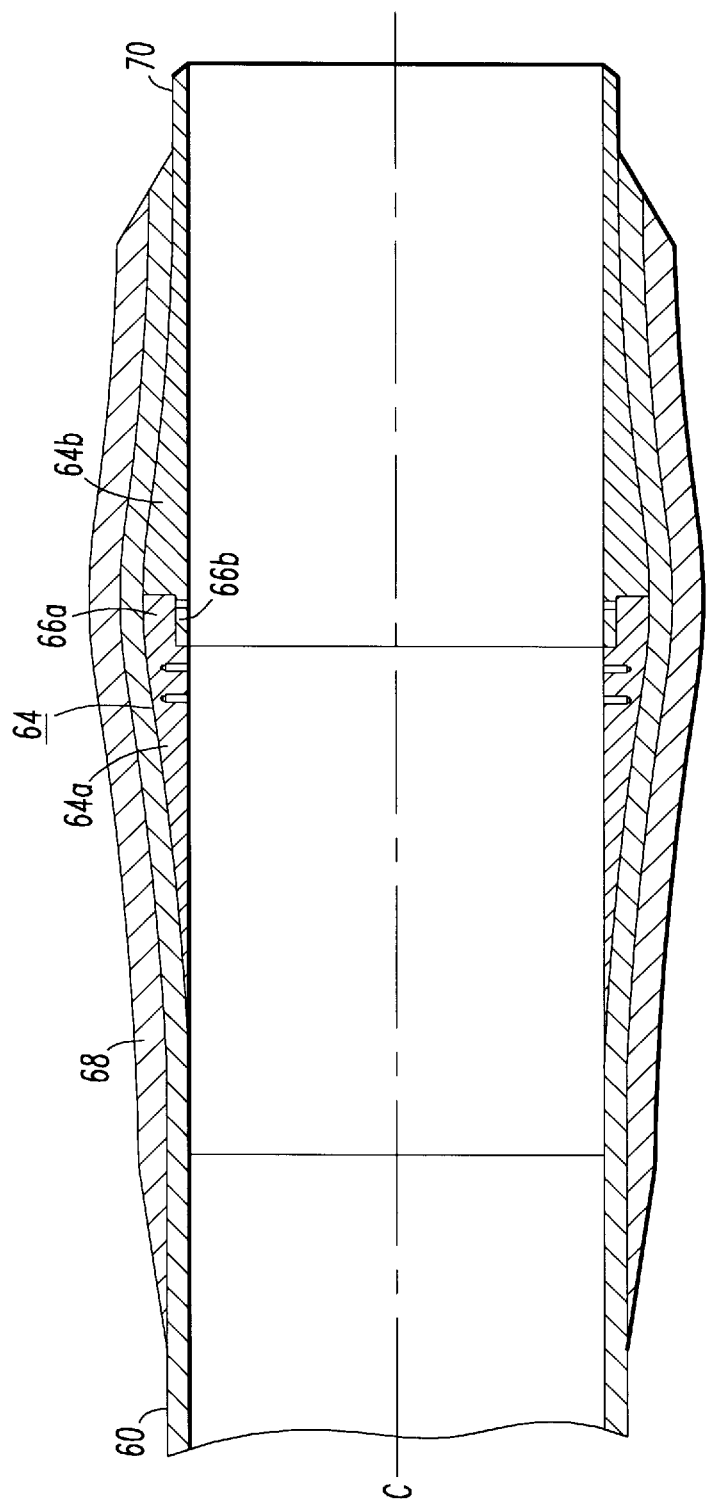
FIG. 4 is an axial cross-sectional view of an embodiment of the invention.

In FIG. 4, illustrating one embodiment of the invention, a composite cylinder 60 extends along, and surrounds a central axis C. An end 62 of the cylinder 60 is formed around an end connection assembly 64, having a contour which will prevent its withdrawal from the cylinder, as previously described.

The end connection assembly includes first and second longitudinally displaced segments 64a and 64b coaxial with central axis C, with each having a respective end 66a and 66b in an overlapping relationship. In order to reduce the amount of displacement when a preloading is applied and to reduce stresses in the joint area, a circumferential overwrap 68 may be applied over the end of the cylinder 60. The cylinder 60 and overwrap 68, which may be formed by any number of manufacturing processes, as previously described, do not cover the extreme end of segment 64b thus allowing a portion 70 to be available for attachment to another structure.

In the present invention, the two segments 64a and 64b are relatively pulled apart and in so doing the overlapping ends 66a and 66b will form a gap or groove. A split, or snap ring is placed into the formed groove thus separating and maintaining the two segments 64a and 64b in a forced apart condition against the inner contoured surface of the cylinder 60 to thereby limit axial movement of the assembly 64 due to predetermined load conditions.

Figure 5:
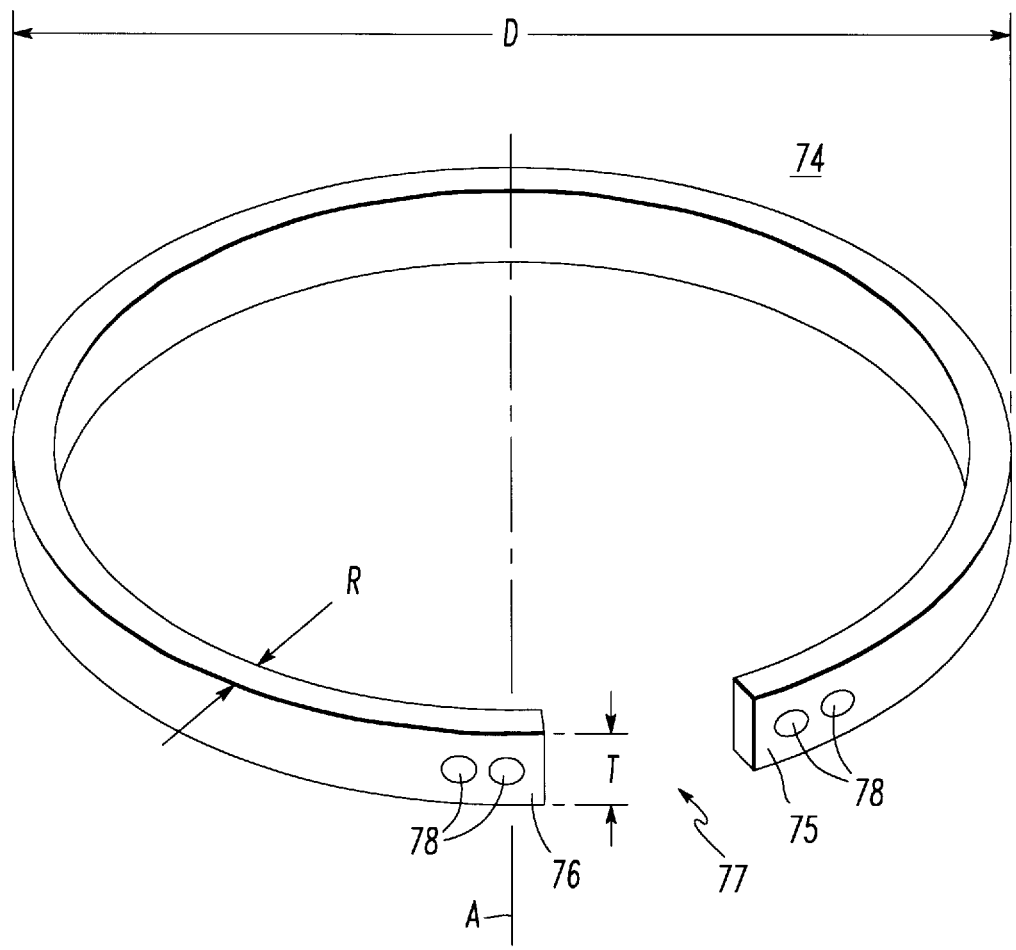
FIG. 5 illustrates one type of snap ring which may be utilized in the present arrangement.

One type of snap ring which may be utilized is illustrated in FIG. 5. The snap ring 74, coaxial about an axis A, has ends 75 and 76 which, in the embodiment illustrated, are separated by a split or gap 77. The ring 74 has a rest diameter D, a radial thickness R and an axial thickness T. The ring 74 is of a material such as steel so as to allow it to be compressed in a manner so as to reduce its diameter. In the embodiment of FIG. 5, ends 75 and 76 may be brought together tending to close gap 77 and reduce diameter D to a point whereby the ring may be inserted into segment 64b of end connection assembly 64. To accomplish the gap and diameter reduction, the ends 75 and 76 may be provided with means such as a series of apertures 78 to allow for the insertion of a tool or other means for drawing the two ends together.

Other embodiments of the snap ring may include those designs wherein there is a minimal, diagonal or even no perceptible gap, and wherein the reduction in diameter is accomplished by sliding one end of the ring past the other end in an overlapping relationship. By way of example, FIG. 5A illustrates a snap ring 80 having ends 81 and 82 which are relatively close to one another and which define a narrow diagonal gap 63. The ends 81 and 82 are drawn together whereby the diagonal surfaces of the ends slide over each other such that, as illustrated in FIG. 5B, the ends are axially displaced and are in an overlapping relationship. Apertures 84 in ends 81 and 82 allow the ends to be secured to a mandrel, or the like, for insertion of the snap ring 80 into the end connection assembly.

Figure 6:
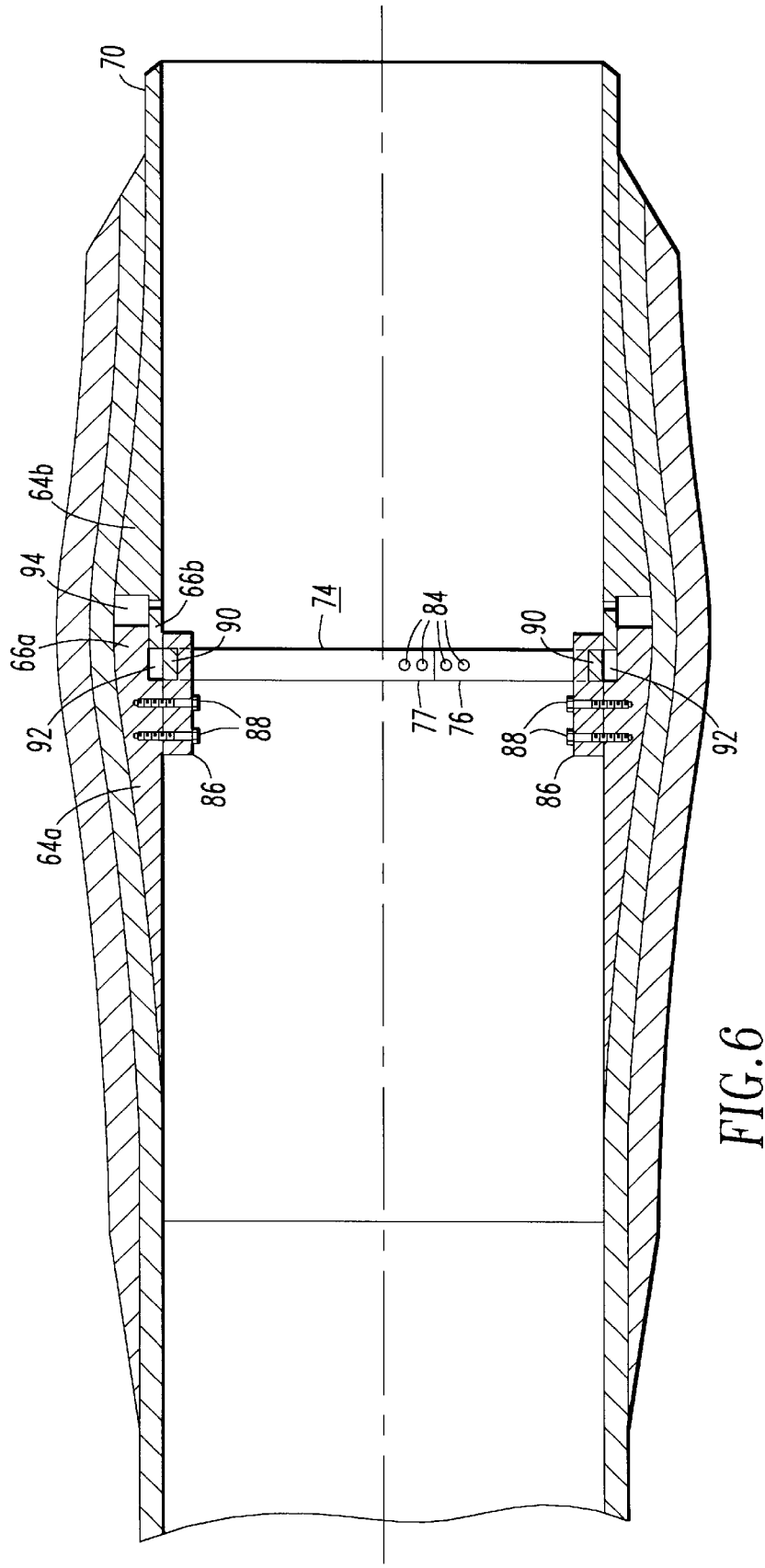
FIGS. 6 and 7 illustrate the placement of the snap ring of FIG. 5 into the structure of FIG. 4.

With additional reference to FIG. 6, and with reference to the snap ring as illustrated in FIG. 5, after the ring diameter has been sufficiently reduced it is inserted into segment 64b and held in position by means of a series of brackets 86 temporarily secured to the inside surface of segment 64a by means of fasteners 88. Each bracket 86 includes a cut out 90 which is fit over the ring 74 to immobilize it while the segments 64a and 66b are drawn apart.

Figure 7:
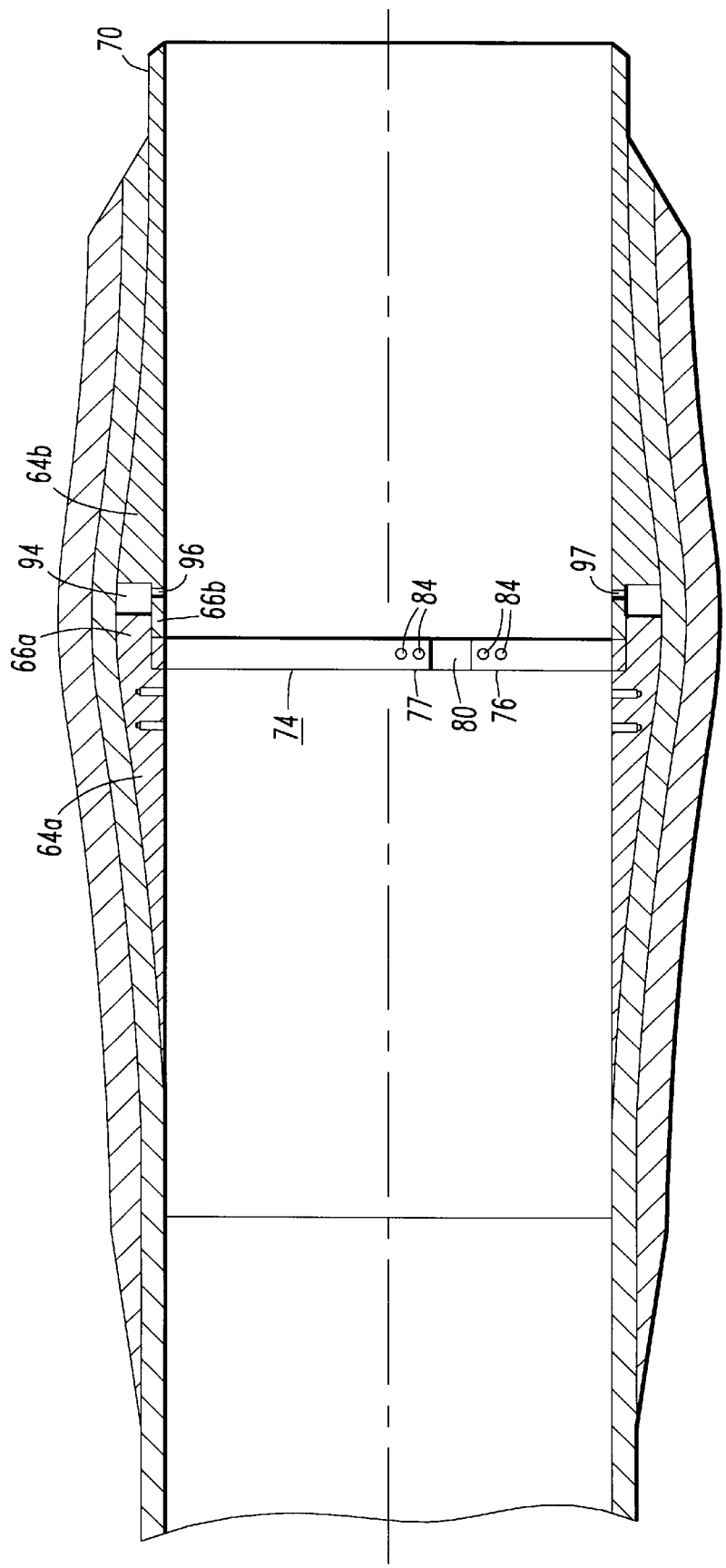

When groove 92, formed by the separating segments 64a and 64b, is of sufficient axial length T, the ring 74 will snap into position into groove 92, again assuming its rest diameter, and maintaining the two segments in a forced apart condition. At this time, and as indicated in FIG. 7, the brackets 86 may be removed and, if desired the cavity 94, formed at the same time as groove 92, may be filled with a resin material introduced via passageway 96, and to aid in the filling process an additional passageway 97 may be provided as an outlet for entrapped air or for a vacuum connection. In order to provide for a smooth interior it is preferable that the formed groove 92 have a depth equal to the radial thickness R of the ring 74. In this regard, the gap 80, in FIG. 7 may be filled in with a material to provide a gapless smooth interior.

As previously brought out, the embodiment of the invention includes a feature wherein a portion 70 of segment 64b extends past the end of the composite cylinder 60. An external connector such as a flange, threaded connector, grooved connector, or the like, may then be coupled to this extended portion for joining the cylinder to another structure.

Figure 8:
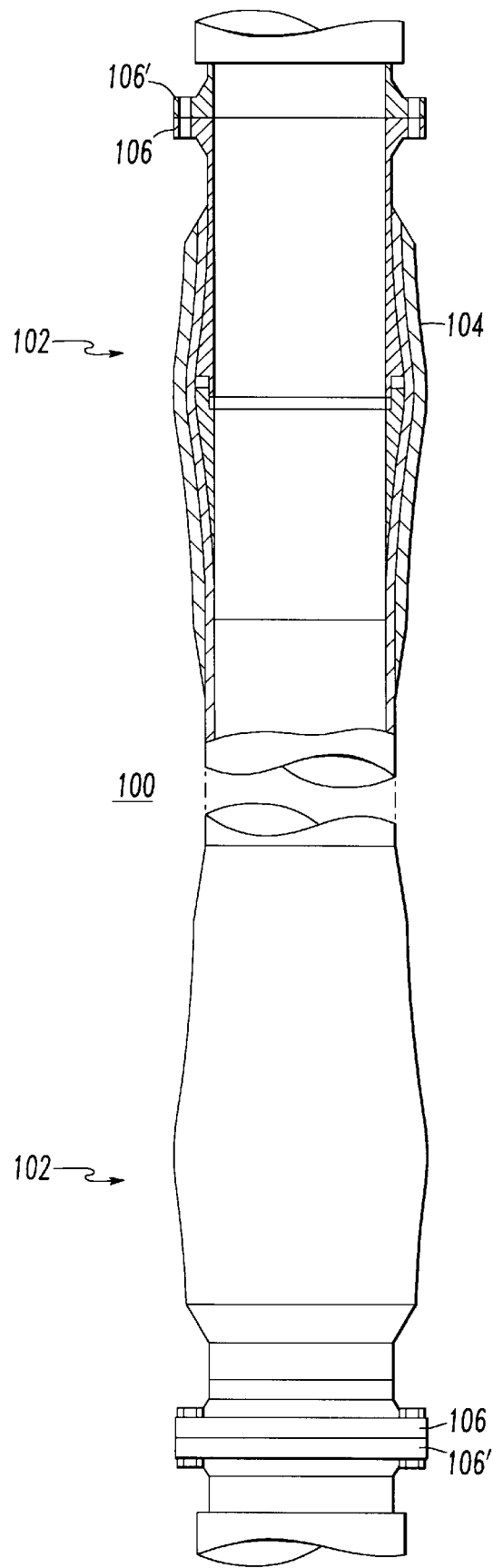
FIG. 8 illustrates a marine riser section made in accordance with the present invention.

By way of example, and with reference to FIG. 8, there is illustrated, partially in section, a typical marine riser 100 including end connection arrangements 102 at both ends and constructed in accordance with the teachings herein. With an end connection assembly 104 having segments made of a metal such as steel, an external connector such as steel flange 106 may be welded to the exposed ends of the segments at either end of the riser section 100. The flanges 106 may then be bolted to the flanges 106' of respective adjacent riser sections, with the process being repeated, thus resulting in a light weight marine riser system.

What is claimed is:

1. A composite-to-end connection arrangement comprising:

(A) a hollow cylinder of composite material extending along a central longitudinal axis;
    (B) an end connection assembly having first and second longitudinally arranged segments coaxial with said axis and in contact with the inner surface of said cylinder at an end thereof, each said segment having an inner surface of predetermined diameter;
    (C) said end of said cylinder being formed about said longitudinally arranged segments to assume the contour thereof, said contour having a predetermined shape so as to prevent withdrawal of said segments from said cylinder;
    (D) a snap ring of rest diameter D and having first and second ends moveable relative to one another to allow it to be compressed to a diameter smaller than D, so as to enable it to be inserted into said end connection assembly and to thereafter assume a larger diameter;
    (E) said snap ring being positioned between said first and second segments, in said larger diameter condition, separating said segments and forcing them into intimate contact with the inner contoured surface of said cylinder, to limit axial movement of said end connection assembly due to predetermined load conditions, or to close any gaps or separation between the composite cylinder and the segments that may arise due to thermal contraction.

2. An arrangement according to claim 1 wherein:
    (A) said snap ring has first and second ends separated by a gap.

3. An arrangement according to claim 1 wherein:
    (A) said snap ring includes means for attachment of a means to reduce said diameter D.

4. An arrangement according to claim 3 wherein:
    (A) said snap ring has first and second ends;
    (B) said means for attachment are constituted by a series of apertures in said first and second ends.

5. An arrangement according to claim 1 wherein:
    (A) said first and second segments have respective overlapping ends.

6. An arrangement according to claim 5 wherein:
    (A) said overlapping ends define a groove when said first and second segments are relatively separated;
    (B) said snap ring being positioned within said groove.

7. An arrangement according to claim 6 wherein:
    (A) said snap ring has a radial thickness of R and an axial thickness of T; and
    (B) said groove has a depth of R and a length of T.

8. An arrangement according to claim 6 wherein:
    (A) said snap ring assumes its rest diameter D when positioned within said groove.

9. An arrangement according to claim 1 wherein:
    (A) said composite cylinder is formed about said longitudinally arranged segments by a process selected from the group consisting of filament winding, tape laying, roll wrapping and hand layup.

10. An arrangement according to claim 1 which includes:
    (A) a circumferential overwrap, covering said end of said cylinder.

11. An arrangement according to claim 1 wherein:
    (A) said cylinder is a marine riser.

* * * * *

UNITED STATES PATENT AND TRADEMARK OFFICE
CERTIFICATE OF CORRECTION

PATENT : 5,813,467

DATED : September 29, 1998

INVENTOR(S) : Jeffrey J. Anderson et al

It is certified that error appears in the above-identified patent and that said Letters Patent is hereby corrected as shown below:

On the title page, item [75] Inventors should read as follows:
--Jeffrey J. Anderson, Sunnyvale, CA; Donald A. Nance, Mountain View, CA; Craig S. Mickelson, San Jose, CA; Daniel A. Stone, Houston, TX--.

Signed and Sealed this

Fourteenth Day of March, 2000

Attest:

Attesting Officer

Q. TODD DICKINSON

Commissioner of Patents and Trademarks